March 4, 1952     F. C. RHODES     2,587,899
LIVE BAIT BOX
Filed Sept. 24, 1948     2 SHEETS—SHEET 1
FIG-1
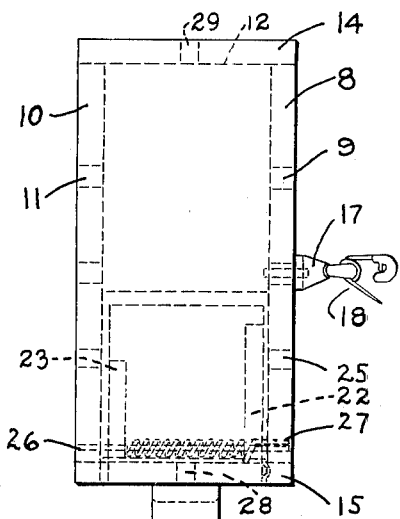
FIG-2
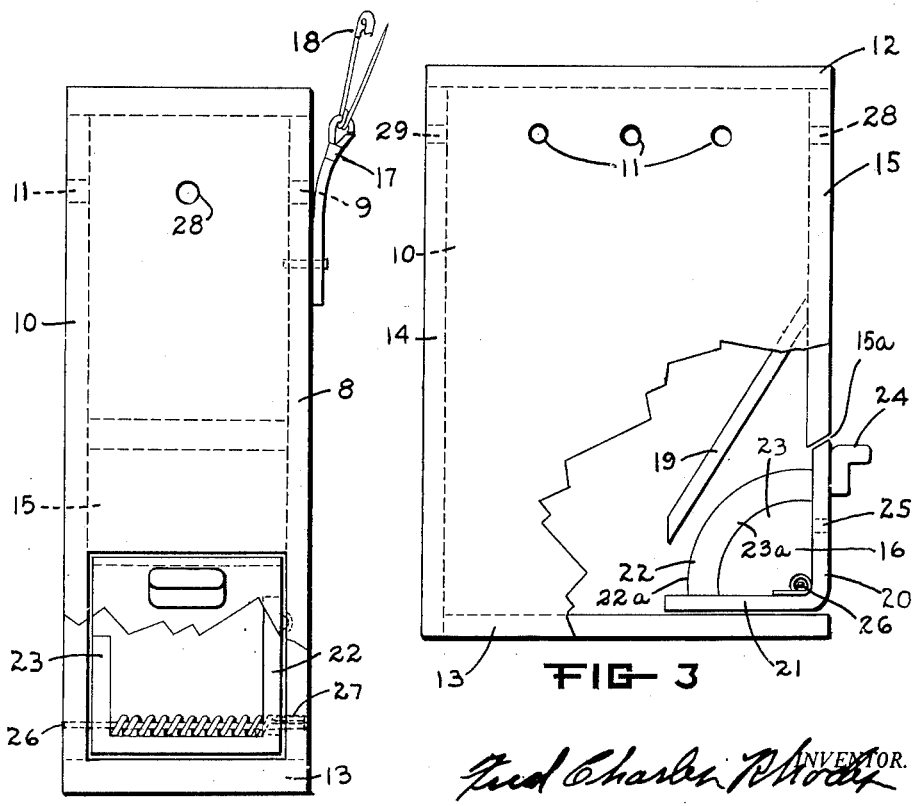
FIG-3
FIG-4
Fred Charles Rhodes INVENTOR.

March 4, 1952     F. C. RHODES     2,587,899
LIVE BAIT BOX
Filed Sept. 24, 1948     2 SHEETS—SHEET 2
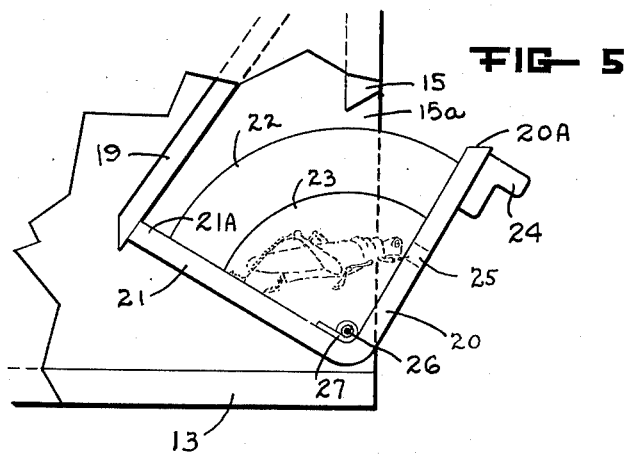
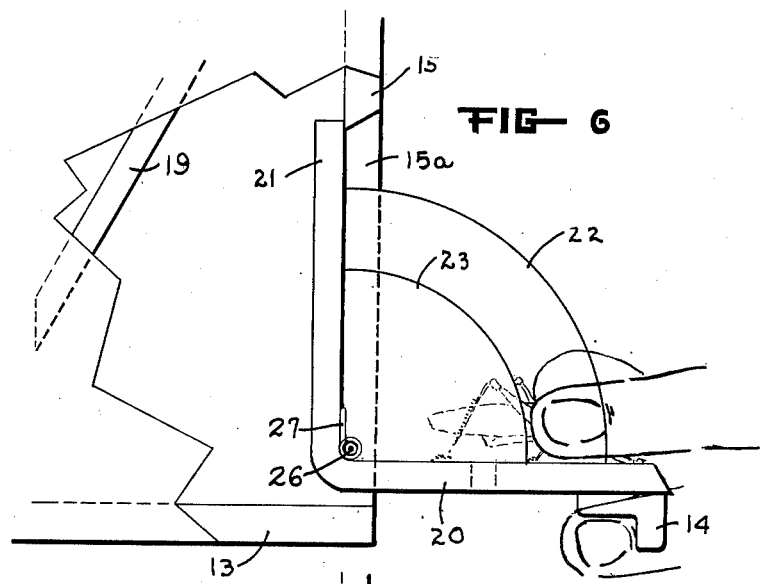
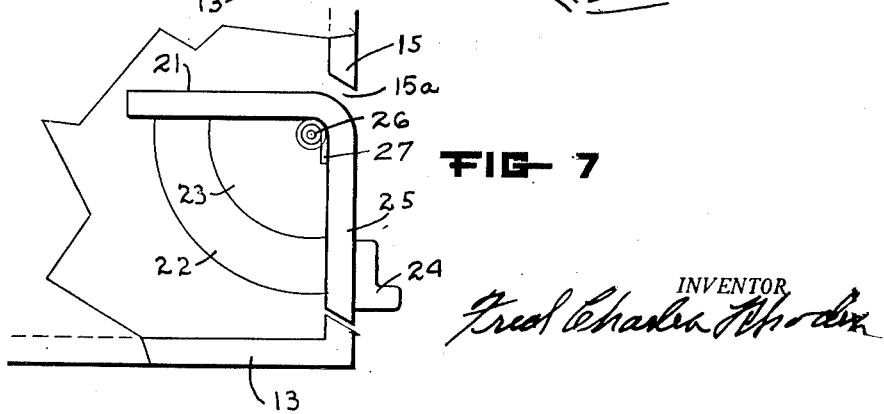

Patented Mar. 4, 1952

2,587,899

UNITED STATES PATENT OFFICE 2,587,899

LIVE BAIT BOX

Fred Charles Rhodes, Inglewood, Calif.

Application September 24, 1948, Serial No. 50,990

2 Claims. (Cl. 43—55)

My general purpose is to provide a live bait box of such light and compact construction that it can be readily attached to a fisherman's shirt, coat or other article of clothing or carried in his pocket and from which the live bait may be extracted quickly and conveniently.

A primary purpose of my invention is to provide a bait box suitable for such live bait as grasshoppers, dragonflies, crickets and other bugs and insects which are well known by fishermen to be excellent fishing bait.

A further object of my invention is to provide a live bait box in which a trap door is so constructed as to be usable not only for the purpose of inserting but also for extracting or releasing a bug or other desired live bait.

An additional object of my invention is that of providing suitable fresh air inlets in my bait box so that the live bait may be safely stored and kept alive for some time by supplying the necessary food through the trap door.

An important object of my invention is to provide a live bait box which is constructed of transparent plastic or other suitable material so that the interior and the bait enclosed within it are always visible from the outside.

An important feature of my invention is that provision is made in the trap door itself for the entrance of fresh air in order to entice a bug or insect into the trap due to an instinctive urge to follow a fresh air current and find a way out.

A further object of my invention is to provide a live bait box in which the trap door for extracting bait is so located at the bottom and either side of the box that the fisherman after a few trial operations readily becomes able to operate the trap door and extract the bait in a substantially subconscious fashion without focusing all of his attention on the operation.

Another advantage of my live bait box is that while opening and closing the trap door for the purpose of removing or inserting a bug the construction of the trap permits the removal of any bug resting on the trap platform but prevents the escape of the other bugs enclosed in the bait box.

Another object of my invention is to provide a live bait box in which the trap door, while normally closed and kept locked by spring action or other suitable means, may be easily opened to a position in which the bug, though partially surrounded by the trap walls, may be readily grasped and picked up by the fisherman.

Additional objects and advantages will be apparent from the following description considered in conjunction with the accompanying sheets of drawings or from both as supplements of each other, wherein are set forth certain novel features of construction, combination and arrangement of parts and functions.

In the accompanying sheets of drawings forming a part of these specifications, and in which like numerals are employed to designate like parts:

Figure 1 is an illustration showing my live bait box attached to the clothing of a fisherman with his hand in the act of operating the trap door.

Figure 2 is a plan view of my live bait box.

Figure 3 is a partial elevation and sectional view showing a bottom hinged trap door.

Figure 4 is a partial side elevation and sectional view particularly illustrating the swivel hook and attachment pin.

Figure 5 is a fragmentary elevation of the trap particularly illustrating the barrier and trap platform side guards.

Figure 6 is a fragmentary elevation of the trap in its fully opened position.

Figure 7 is a fragmentary elevation of a top hinged trap, modified for bottom operation.

Referring now in detail to Figures 1, 2, 3, 4, 5, 6 and 7 wherein for purposes of illustration are shown preferred embodiments of my invention, the transparent bait enclosure is formed with a back wall 8 provided with ventilating openings 9, and front wall 10 also provided with ventilating openings 11. Separating and secured to the back and front walls are the top wall 12, bottom wall 13, side wall 14 provided with ventilating opening 29 and side wall 15 which is provided with ventilating opening 28 and an opening 15a for the insertion and movement of trap 16.

A swivel hook 17 is secured close to the back of the top wall 8 and is provided with an attachment pin 18 for the purpose of fastening the box to the fisherman's clothing. A barrier 19 is provided above the trap 16 to prevent the bait from entering the trap and to close the exit opening while the trap is being opened or closed.

The trap 16 consists of a side or door 20 to which is secured a closure plate and bait platform or side 21. A portion 21a of member 21 constitutes a stop to limit the outward movement of member 20, and the edge portion 20a of member 20 constitutes a stop to limit the inward movement of the said member 20. Attached to the back side edges of door 20 is a guard or wall 22 having an arcuate free edge portion 22a and oppositely attached to the front edges of door 20 is a similar guard or wall 23 of smaller dimensions than member 22, said wall 23 having an arcuate side portion 23a. Guard 23 is of smaller area than guard 22 in order to facilitate ready finger manipulation by the fisherman when grasping and picking the bait out of the trap. To the outside of trap door 20 is secured finger grip 24. Ventilating opening 25 is placed in trap door 20 close to the bait platform 21 for fresh air ingress. A hinge pin 26 passes through the back of the trap and back and front guards 22 and 23 and is secured in the back and front walls 8 and 10. Surrounding hinge pin 26 is a helical spring 27 with one end secured to back wall 8 and the other end pressing against the trap closure plate and bait platform 21 in a state of torsional stress tending to close the trap and keep the trap door 20 in its closed position.

In the utilization of my live bait box the several types of bugs and insects such as grasshoppers, butterflies, and other live bait are caught or purchased and deposited in the box through the trap door and then the box is fastened in a suitable place to the fisherman's clothing. The fisherman may then walk from place to place and when necessary and with little thought being given to the process he may obtain his bait from the live bait box by operating the trap, extracting and picking up the desired bug without the danger of the remaining bugs escaping.

A supply of bugs, large enough to last for several days fishing trip, may be placed in my live bait box and by inserting at frequent times small portions of appropriate food material the bait may be kept alive and available for instant use, or fishing supply stores may obtain and keep for sale live bait in my live bait boxes for the period of the fishing season or as the demand arises.

If the fisherman wants to obtain two or more bugs either for his own use of to supply another member of the fishing party, the transparent walls of my live bait box make it possible to see how many and what type of bugs are in the trap and by shaking and turning the live bait box he may select and position in the trap the kind and quantity of bugs desired and by quickly opening the trap door, pick them up without losing any of the other bugs left in the box.

It will be understood that while the form of my live bait box as herein illustrated and described is to be considered as a preferred embodiment of my invention, I do not limit myself to the precise construction as disclosed but reserve the right to resort to various changes in the shape, size and arrangement of parts without departing from the spirit of my invention as disclosed by the above specification or by the accompanying drawings or by both as supplements of each other or the scope of the following claims.

Having thus described my invention, I claim:

1. A fisherman's bait box for live bait comprising a transparent receptacle having a wall with an opening therein, a pivot extending transverse to the opening and parallel to one edge thereof, and a trap swingably mounted on the pivot, said trap having two sides at right angles to each other, and opposing walls, each secured to both sides, the free edges of the opposing walls being arcuate, and one of said edges having a smaller radius than the other.

2. The bait box as defined in claim 1, one of said sides of said trap having a portion thereof constituting a stop and the other side having an edge thereof constituting a stop, the receptacle wall opening having a portion thereof defining a stop for cooperation with one of said stops.

FRED CHARLES RHODES.

REFERENCES CITED

The following references are of record in the file of this patent:

UNITED STATES PATENTS

| Number | Name | Date |
|---|---|---|
| 428,799 | Breul | May 27, 1890 |
| 620,805 | Russ | Mar. 7, 1899 |
| 896,759 | Robinson | Aug. 25, 1908 |
| 1,150,776 | Lamb | Aug. 17, 1915 |
| 1,465,814 | Forsburg | Aug. 21, 1923 |
| 1,752,527 | Howard | Apr. 1, 1930 |
| 1,900,035 | Beck | Mar. 7, 1933 |
| 1,986,742 | Mosher | Jan. 1, 1935 |
| 2,018,278 | Myers | Oct. 22, 1935 |
| 2,160,436 | Jones | May 30, 1939 |